(12) United States Patent
Subbaroyan et al.

(10) Patent No.: US 6,442,606 B1
(45) Date of Patent: Aug. 27, 2002

(54) METHOD AND APPARATUS FOR IDENTIFYING SPOOF DOCUMENTS

(75) Inventors: Ram Subbaroyan, San Francisco; Yongdong Wang, Alamo; Paul Andre Gauthier; Douglas Michael Cook, both of San Francisco; Douglass Russell Judd, San Jose, all of CA (US)

(73) Assignee: Inktomi Corporation, Foster City, CA (US)

( * ) Notice: Subject to any disclaimer, the term of this patent is extended or adjusted under 35 U.S.C. 154(b) by 0 days.

(21) Appl. No.: 09/374,315

(22) Filed: Aug. 12, 1999

(51) Int. Cl.[7] ............................................... G06F 13/00
(52) U.S. Cl. ...................................... 709/224; 709/217
(58) Field of Search .............................. 709/200, 201, 709/203, 217, 218, 219, 220, 223, 224

(56) References Cited

U.S. PATENT DOCUMENTS

| | | | | |
|---|---|---|---|---|
| 5,987,153 A | * | 11/1999 | Chan et al. | 382/115 |
| 6,006,197 A | * | 12/1999 | d'Eon et al. | 705/10 |
| 6,145,003 A | * | 11/2000 | Sanu et al. | 709/225 |
| 6,236,768 B1 | * | 5/2001 | Rhodes et al. | 382/306 |
| 6,269,370 B1 | * | 7/2001 | Kirsch | 707/10 |
| 6,356,936 B1 | * | 3/2002 | Donoho et al. | 709/206 |

* cited by examiner

Primary Examiner—Moustafa M. Meky
(74) Attorney, Agent, or Firm—Hickman Palermo Truong & Becker LLP; Carl L. Brandt; Edward A. Becker

(57) ABSTRACT

A method and apparatus are provided for indexing electronic documents that include one or more visible text portions and one or more non-visible text portions. The method includes the step of identifying an electronic document. Once the electronic document is identified, a set of words is selected from a particular tag type that is associated with one or more non-visible text portions of the electronic document. Each word in the selected set of words is compared with words in the one or more visible text portions of the electronic document. An index word set is then determined for the electronic document based on matches between words in the selected set of words and words in the one or more visible text portions of the electronic document.

39 Claims, 5 Drawing Sheets

METHOD AND APPARATUS FOR IDENTIFYING SPOOF DOCUMENTS

FIELD OF THE INVENTION

The present invention generally relates to data processing. The invention relates more specifically to identifying spoof documents among a large collection of electronic documents that are associated with, for example, an indexing system or search-and-retrieval system.

BACKGROUND OF THE INVENTION

The Internet, often simply called "the Net," is a world-wide system of computer networks and, in a larger sense, the people using it. The Internet is a public, self-sustaining facility that is accessible to tens of millions of people worldwide. The most widely used part of the Internet is the World Wide Web, often abbreviated "WWW" or simply referred to as just "the Web". The Web is an Internet service that organizes information through the use of hypermedia. The HyperText Markup Language ("HTML") is used to specify the contents and format of a hypermedia document (e.g., a Web page).

In this context, an HTML file is a file that contains the source code for a particular Web page. A Web page is the image that is displayed to a user when a particular HTML file is rendered by a browser application program. Unless specifically stated, an electronic or Web document may refer to either the source code for a particular Web page or the Web page itself.

Each page can contain imbedded references to images, audio, or other Web documents. A user, using a Web browser, browses for information by following references, known as hyperlinks, that are embedded in each of the documents. The HyperText Transfer Protocol ("HTTP") is the protocol used to access a Web document.

Through the use of the Web, individuals have access to millions of pages of information. However a significant drawback with using the Web is that because there is so little organization to the Web, at times it can be extremely difficult for users to locate the particular pages that contain the information that is of interest to them.

To address this problem, a mechanism known as a "search engine" has been developed to index a large number of Web pages and to provide an interface that can be used to search the indexed information by entering certain words or phases to be queried. Indexes are conceptually similar to the normal indexes that are typically found at the end of a book, in that both kinds of indexes comprise an ordered list of information accompanied with the location of the information. Values in one or more columns of a table are stored in an index, which is maintained separately from the actual database table. An "index word set" of a document is the set of words that are mapped to the document in an index. For documents that are not indexed, the index word set is empty.

Although there are many popular Internet search engines, they are generally constructed using the same three common parts. First, each search engine has at least one "spider" that "crawls" across the Internet to locate Web documents around the world. Upon locating a document, the spider stores the document's Uniform Resource Locator (URL), and follows any hyperlinks associated with the document to locate other Web documents. Second, each search engine contains an indexing mechanism that indexes certain information about the documents that were located by the spider. In general, index information is generated based on the contents of the HTML file. The indexing mechanism stores the index information in large databases that can typically hold an enormous amount of information. Third, each search engine provides a search tool that allows users to search the databases in order to locate specific documents that contain information that is of interest to them. To provide up-to-date information, the spiders continually crawl across the Internet to identify both new and updated documents for indexing. When a new or updated page is identified, the search engine makes corresponding updates to the database so as to continually provide up-to-date information.

Electronic documents include both visible text portions and non-visible text portions. The visible text portions of an electronic document includes the textual information that is contained in the document and which is displayed to a user when the electronic document is rendered using an application such as a Web browser. The non-visible text portions include the textual information that is contained in the electronic document but which is not displayed, and therefore is not visible to a user when the document is rendered using an application such as a Web browser. For example, FIG. 1A illustrates an HTML file 100 that contains both visible text portions and non-visible text portions. The visible text portions include text data 108 which is displayed when HTML file 100 is rendered by a browser application such as Netscape Navigator® or MicroSoft Internet Explorer®. Alternatively, the non-visible text portions include title data 104 and comment data 106. Also depicted in FIG. 1A. are HTML tags 102 which represent codes that are used by browser applications to determine what information is to be made visible and how the visible information is to be structured and formatted when displayed. Title data 104 and comment data 106, also referred to as metadata, include textual information, referred to herein as "metawords", that may be included in an HTML file but which is not displayed when the document is rendered by a browser application. For example, FIG. 1B illustrates Web page 110 as seen by rendering HTML file 110 through the use of a browser application. As depicted, upon rendering HTML file 100, the visible text portion (text data 108) is displayed in Web page 110 and is therefore visible to the user. Alternatively, the non-visible text portions (title data 104 and comment data 106), are not displayed in Web page 110 and therefore are not visible to the user.

Different search engines use different techniques to extract and index information contained on the Internet. For example, some search engines use indexing mechanisms that index every single word in each document, while others index only the first "N" number of words in each document.

Because certain non-visual portions of documents typically provide an accurate description of the visual contents of the document, many search engines index not only the visual text portion but also sections of the non-visible text portions. For example, the metadata associated with the tag <title> typically include title information that concisely and accurately describes the subject matter or contents of the particular document. Similarly, the metadata associated with the tag <comment> may include comment information that relates to the subject matter or contents of the particular document. An illustrated example is provided by title data 104 and comment data 106 of FIG. 1A. Thus, by indexing a document based on the metadata that is associated with certain tags contained therein, the documents can be indexed in a way that accurately reflects its contents.

Because the results of a query search are highly dependent on the indexes that are used to process the query, it is critical that the indexes used in a search be accurate as possible.

Therefore, it is important that the indexing mechanisms index each document based on those words or terms that most accurately describe the contents of the document. However, for certain Web marketers and site designers, there is a desire or motivation to have as many "hits" on their Web pages as possible. Thus, to increase the number of hits on a particular Web page, certain Web page developers have employed a technique known as ""spamdexing" to cause numerous non-representative index entries to be generated for their Web pages.

In this context, the term spamdexing is defined as adding additional words or terms to a document in order to affect how the document is indexed or otherwise treated. Spamdexing may be performed by adding unrelated visible text to a document, and/or by adding non-visible metadata. Documents in which spamdexing has been applied are generally referred to as "spoof" documents.

Frequently, the added words or terms do not provide an accurate description of the contents or subject matter of the particular document, but are added to cause the document to be found by searches in relatively unrelated topics. Alternatively, the added words may accurately reflect the content of the document, but be added in a way that causes the document to be given a higher "ranking" than it would otherwise deserve.

One of the most common forms of spamdexing is commonly known as "word-stuffing", in which a particular word is embedded within a page dozens or even hundreds of times to ensure that the page always appears at or near the top of the list of search engine results for searches that contain that word. For example, a personal home page that describes the antics of somebody's pet dog may have embedded therein thousands of instances of the word "dog" to ensure that the page will be highly ranked in the results of all queries that include the word "dog".

Another form of spamdexing is commonly known as "bait-and-switch", in which a page is loaded with some popular search word such as "sex" or "free" or "prize" even though that particular word has nothing to do with the contents of the site.

Based on the foregoing, it is highly desirable to provide a mechanism that can detect spoof documents. It is also highly desirable to accurately index the contents of non-spoof documents.

SUMMARY OF THE INVENTION

The foregoing needs, and other needs and objects that will become apparent from the following description, are achieved in the present invention, which comprises, in one aspect, a method for indexing electronic documents that include one or more visible text portions and one or more non-visible text portions, comprising the computer-implemented steps of identifying an electronic document; selecting from the electronic document a set of words that are associated with a particular tag type, wherein the set of words is selected from words within the one or more non-visible text portions of the electronic document; comparing each word in the selected set of words with words in the one or more visible text portions of the electronic document; and determining an index word for the electronic document based on matches between words in the selected set of words and words in the one or more visible text portions of the electronic document.

One feature involves determining a plurality of selected tag types, the plurality of selected tag types including the particular tag type; and selecting from the electronic document multiple sets of words, wherein each set of the multiple sets of words is associated with one of the selected tag types.

Another feature involves performing the step of determining an index word set for the electronic document by determining a percentage of matches based a particular number of matches that are found between words in said selected set of words and words in said one or more visible text portions of said electronic document; determining a minimum match percentage for the set of words; and if said percentage of matches is below said minimum match percentage, then generating the index word set based only on those words in said selected set of words for which there is a corresponding match in said one or more visible text portions of said electronic document.

According to another aspect, a method for indexing an electronic document is provided, the method comprising the computer-implemented steps of identifying a first portion of the electronic document that is not displayed when the document is rendered; identifying a second portion of the electronic document that is displayed when the document is rendered; performing a comparison between words from the first portion and words from the second portion; determining a set of words from said first portion to use to index said electronic document based on said comparison; and indexing said electronic document based on said set of words.

The invention also encompasses a computer-readable medium and an apparatus configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for detecting spoof documents is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1A:
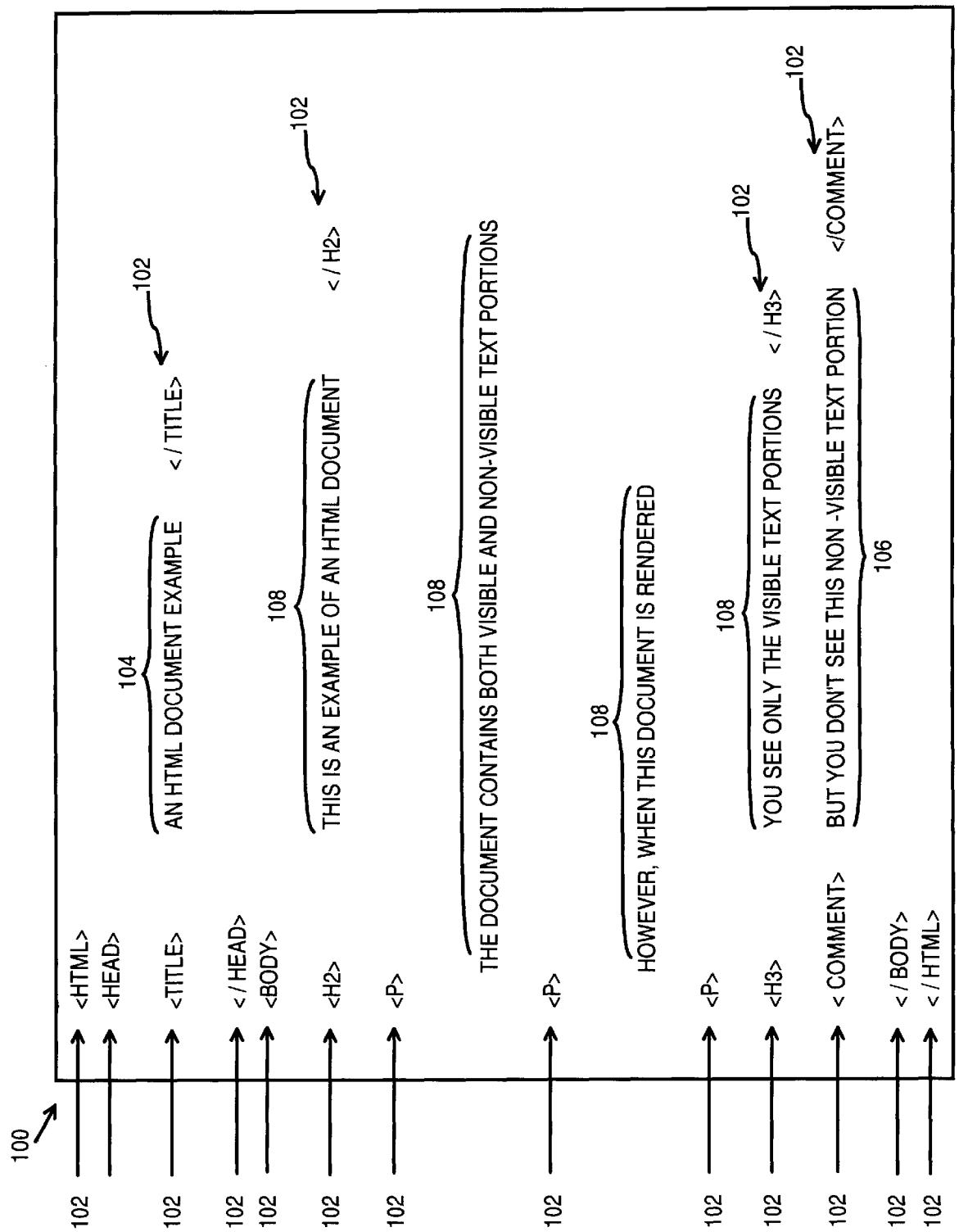
FIG. 1A illustrates an HTML file that contains both visible text portions and non-visible text portions.
Figure 1B:
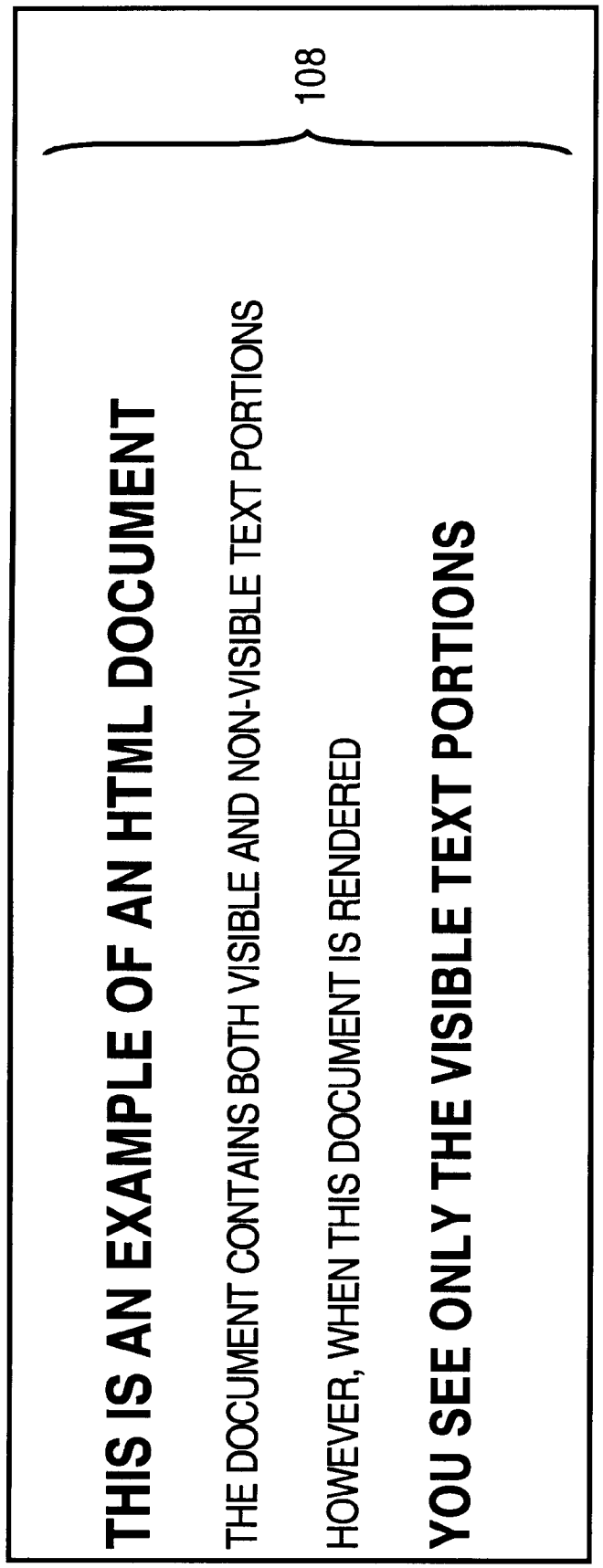
FIG. 1B illustrates the rendering of the HTML file of FIG. 1A through the use of a browser application.
Figure 2:
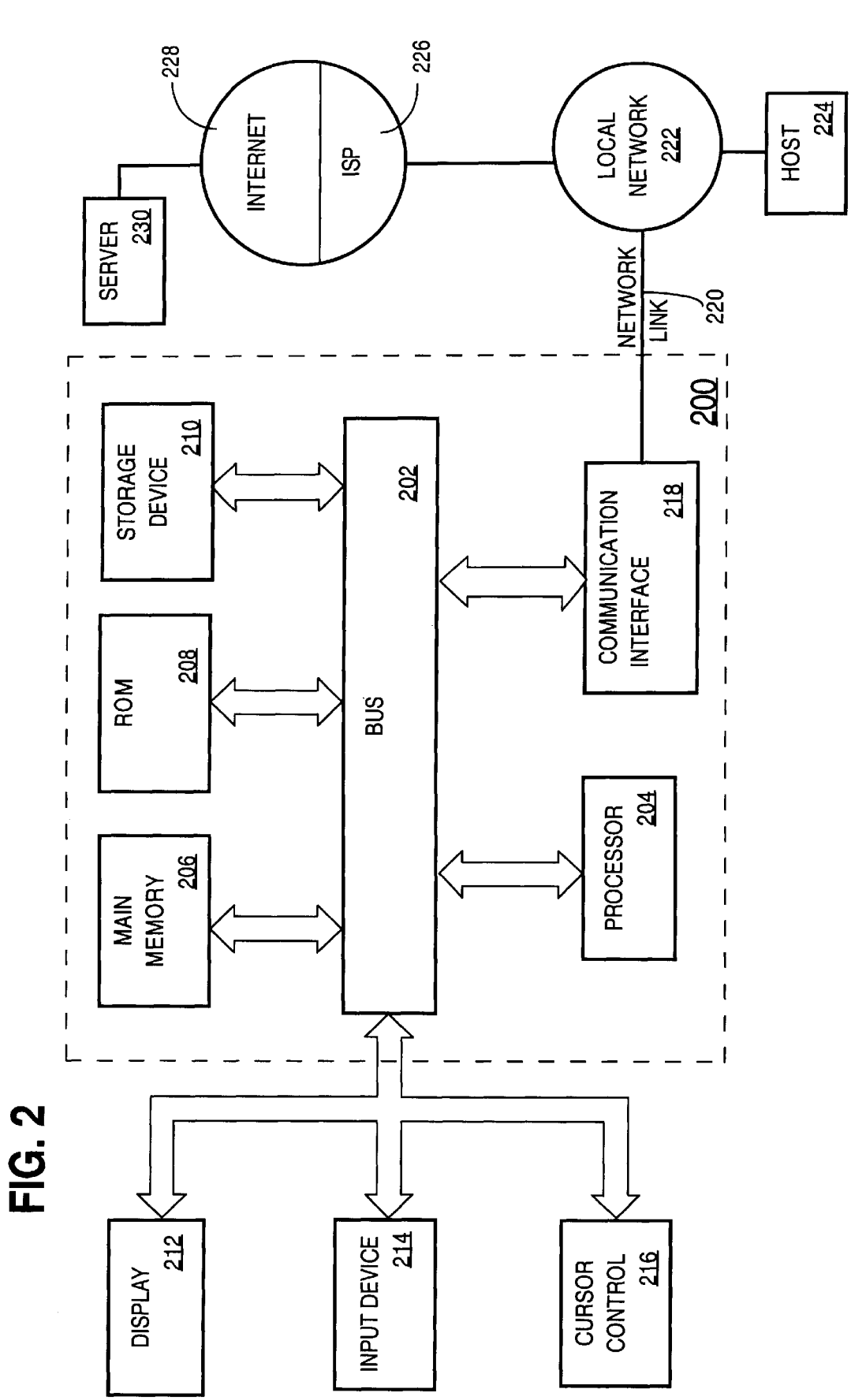
FIG. 2 is a block diagram illustrating a computer system on which an embodiment of the present invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for detecting spoof documents. According to one embodiment of the invention, the detection of spoof documents is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for detecting spoof documents as described herein.

The received code may be executed by processor 204 as it is received, and/or stored in storage device 210, or other non-volatile storage for later execution. In this manner, computer system 200 may obtain application code in the form of a carrier wave.

FUNCTIONAL OVERVIEW

For purposes of explanation, embodiments of the invention shall be described in the context of Web pages. However, the invention is not limited to any particular form of electronic document.

As previously stated, when indexing documents contained on the Web, it is important that indexes are only created for those words or categories that are actually representative of the information that is contained in the Web page.

According to one embodiment, an authentication mechanism is provided for applying a set of "authentication rules" during the analysis of a Web page. The authentication rules determine which words in the Web page should be considered and, conversely, which words should be ignored, during the indexing of the Web page. The authentication rules are designed to exclude, for indexing purposes, content that is likely to be the result of spamdexing.

Specifically, during the analysis of a Web page, the authentication mechanism looks for certain tags. The tags that are looked for by the authentication mechanism are referred to herein as "selected tags". Generally, selected tags are tags that, under normal circumstances, accurately reflect the content of the Web page, but may have been modified for the purpose of spamdexing. For example, the tag <title> is associated with metadata that is typically descriptive of the contents of the particular Web page. Likewise, the tag <comment> is associated with metadata that is also typically descriptive of the contents of the particular Web page. Therefore, the "title" and "comment" tags may be selected tags for which the authentication mechanism searches.

For each selected tag identified during the analysis of a Web page, its corresponding metadata is selected and a set of authentication rules is applied to metawords within the selected metadata to determine whether spamdexing has been applied to the metadata. If it is determined that spamdexing has been applied to the metadata, then the document is identified as a spoof document.

In one embodiment, in applying the set of authentication rules, the metawords that are associated with each of the selected tags are compared to the visible text portions of the document to identify matches. Based on the number of matches that are found, a particular number of metawords are selected for generating indexes for the Web page. In one embodiment, certain metawords are "bonused" (i.e., given a higher rank) as part of the search engine's indexing formula.

SELECTED TAG TYPES

HTML supports several different types of tags. These different types of tags are well documented and can be found in numerous publications such as in a book titled "HTML The Definitive Guide, 3rd Edition" written by Musciano & Kennedy and published in 1998 by O'Reilly & Associates.

In one embodiment of the invention, for the purpose of indexing, the metawords associated with certain types of tags are ignored, while the metawords associated with other types of tags are considered. In general, tags are used to define a format change or hypertext link. For explanation purposes, the tag types that are considered for indexing purposes shall be referred to as "selected" tag types. Also for explanation purposes, metawords that are associated with selected tag types shall be referred to as "selected" metawords.

In one embodiment, the selected tag types include the HTML tags <comment> and <title> and the HTML tag <meta> when it includes the field "keywords" or the field "description". The "keywords" meta field contains the words most representative of the content of the document. The "description" meta field contains an abstract of the content of the document.

For example, a <meta> tag that includes the field "keywords" could appear in a Web page as follows:
<META NAME="keywords" CONTENT="Inktomi network cache search engine">.

Similarly, a <meta> tag that includes the field "description" could appear in a Web page as follows:

<META NAME="description" CONTENT="Inktomi develops and markets scalable software designed for the world's largest Internet infrastructure and media companies.">.

In describing embodiments of the invention, <meta> tags that include the field "keywords" shall be referred to as "<meta_keywords>" tags and <meta> tags that include the field "description" shall be referred to as "<meta_description>" tags.

LIMITING THE NUMBER OF METAWORDS TO CONSIDER

In certain embodiments, a limited number of selected metawords are actually considered for the purpose of indexing. Thus, only a subset of the selected metawords within a Web page may actually be used to index the Web page. For example, in an exemplary embodiment, all metawords associated with the tag <title> or the tag <meta_description> are considered for purpose of indexing. However, for the tag <comment> and the tag <meta_keywords>, only the first fifteen ("15") words are considered for purpose of indexing.

For example, consider a non-visible text portion of a Web page that includes:
<META NAME="keywords" CONTENT="The major league record for the most homeruns in a season is currently sixty-one. However, the single season homerun record may be broken this year by Mark McGuire and Sammy Sosa. This page provides a brief history of the previous major league ballplayers that hit fifty or more homeruns in a single season".

In this example, only the first fifteen (15) metawords:
"The"; "major"; "league"; "record"; "for"; "the"; "most"; "homeruns"; "in"; "a"; "season"; "is"; "currently"; "sixty-one"; "However", are considered for the purpose of indexing. For explanation purposes, the set of selected metawords that are considered for the purpose of indexing shall be referred to as "considered-for-indexing" metawords.

DISCOUNTING STOP WORDS

In one embodiment, "stop-words" contained in the selected set of tags are not indexed. Stop-words are words that are ignored for the purpose of indexing (usually because they are so common they would not usefully limit a search). Appendix A contains a list of some of the most common stop-words. Because stop-words do not provide a meaningful description of the actual contents of a document, in certain embodiments, stop-words are not considered in determining the number of considered-for-indexing metawords that have been selected for a selected tag for the purpose of indexing. For example, referring to the HTML comment example above, by not indexing the stop-words contained in Appendix A, the following fifteen (15) considered-for-indexing metawords would be selected for indexing:

"major"; "league"; "record"; "homeruns"; "season"; "currently"; "sixty-one"; "single"; "season"; "homerun"; "record"; "broken"; "Mark"; "McGuire".

In this example, the word "sixty-one" is considered as two separate words. However, in certain embodiments, hyphenated or other similar forms of words may actually count as a single word. Thus, embodiments of the invention are not limited to any specific method for determining whether a particular word counts as a single or multiple words.

REMOVING DUPLICATE METAWORDS

In some Web pages, selected tags will contain duplicate metawords. According to one embodiment, a metaword is considered to be a duplicate of another metaword if they are the same word. For example, if the metaword "ride" is contained multiples times within a particular tag, only a single version of the metaword ("ride") is indexed.

By not indexing duplicate metawords, the effects of word-stuffing can be greatly reduced. For example, referring to the HTML keyword example above, by not indexing duplicate metawords, the following fifteen (15) considered-for-indexing metawords would be considered for the purpose of indexing:

"major"; "league"; "record"; "homeruns"; "season"; "currently"; "sixty-one"; "single"; "homerun"; "broken"; "Mark"; "McGuire"; "Sammy"; "Sosa".

COMPARING METAWORDS WITH THE TEXT OF THE DOCUMENT

In one embodiment, the considered-for-indexing metawords associated with a selected tag in a Web page are compared with the visible text portions of the Web page to determine a percentage of matches. Based on the percentage of matches, a particular number of the considered-for-indexing metawords are chosen as selected-for-indexing metawords. The selected-for-indexing metawords are then used to index the Web page. All words that are used to index a Web page, including the selected-for-indexing metawords, are referred to herein as the "indexing words" of the Web page.

In an exemplary embodiment, the considered-for-indexing metawords for a particular tag are only compared with the visible text portions of the Web page if a threshold number of metawords are associated with a particular tag. For example, in one embodiment, if greater than 15 metawords are associated with the tag <title> then the considered-for-indexing metawords associated with the tag <title> are compared with the visible text portions of the Web page. Alternatively, if 15 or fewer metawords are associated with the tag <title> then the considered-for-indexing metawords associated with the tag <title> are not compared with the visible text portions of the Web page.

In certain embodiments, if less than fifty percentage (50%) of the considered-for-indexing metawords for a selected tag do not have a match (i.e. are not contained) in the visible text portion of the document, then only those considered-for-indexing metawords that have a match within the visible text portion of the document are chosen as selected-for-indexing metawords. However, if fifty percent (50%) or more of the considered-for-indexing metawords for a selected tag in a Web page have a match in the visible text portion of the Web page, then all of the considered-for-indexing metawords associated with the selected tag are chosen as selected-for-indexing metawords.

Figure 3:
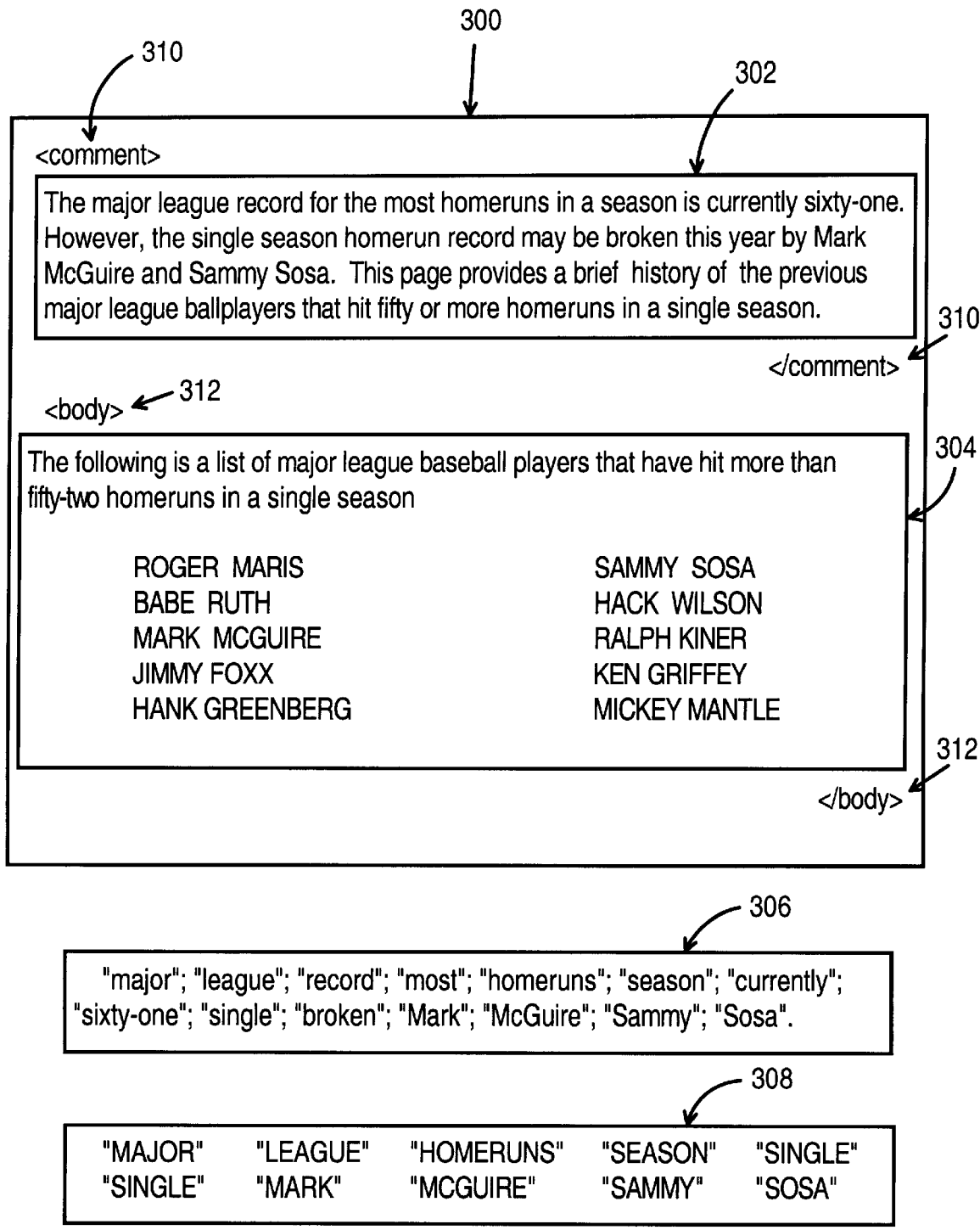
FIG. 3 illustrates an HTML page and a corresponding set of selected metawords and a set of matching words.

For example, FIG. 3 illustrates a Web page 300, a set of considered-for-indexing metawords 306 and a set of matching metawords 308. The Web page 300 includes a non-visible text portion 302, a visible text portion 304 and selected tags 310 and 312. In this example, the set of considered-for-indexing metawords 306 includes a total of fifteen (15) words. The set of considered-for-indexing metawords 306 represents the first fifteen ("15") metawords from non-visible text portion 302, excluding any stop-words or duplicates. By comparing the considered-for-indexing metawords 306 to the words in the visible text portion 304, a total of nine (9) matching metawords are identified. The words of considered-for-indexing metawords 306 that match words in the visible text portion 304 are shown as matching metawords 308. Thus, nine (9) of the fifteen (15) words contained in considered-for-indexing metawords 306, or sixty percent (60%), have matches within visible text portion 304. Therefore, in this example, all of the considered-for-indexing metawords 306 are chosen as selected-for-indexing metawords.

Alternatively, if less than fifty percent (50%) of the considered-for-indexing metawords 306 had matches in visible text portion 304, a limited number of words within the considered-for-indexing metawords 306 would be chosen as selected-for-indexing metawords. In an exemplary embodiment, if less than fifty percent (50%) of the considered-for-indexing metawords 306 have matches within visible text portion 304, then only those words within considered-for-indexing metawords 306 that have matches within visible text portion 304 are chosen as selected-for-indexing metawords.

In certain embodiments, the percentage of matches required of the considered-for-indexing metawords may differ for each selected tag. For example, it may be required that the considered-for-indexing metawords that are associated with the <title> tag and <comment> tag have at least a fifty percent (50%) match with words in the visible text portions of the document to have all considered-for-indexing metawords chosen as selected-for-indexing metawords. Alternatively, it may be required that the considered-for-indexing metawords that are associated with the <meta_keywords> tags and the <meta_description> tags have at least a seventy-five percent (75%) match with words in the visible text portions of the document to have all considered-for-indexing metawords chosen as selected-for-indexing metawords. Thus, embodiments of the invention are not limited to any specific match percentage for any particular tag.

In addition, although FIG. 3 illustrates an example in which the metawords associated with the <comment> tag are indexed, in certain cases, these metawords are not considered particularly representative of the content of the Web page. Therefore, in certain embodiments, the metawords associated with <comment> tags are not considered when indexing the contents of a Web page.

BONUSING CERTAIN WORDS

To provide users with the most relevant information for their search requests, each indexed word is associated with a particular weight that generally indicates how relevant or representative the indexed word is of the contents of the particular Web page. In general, the metawords that are associated with certain types of tags typically provide a better indication of the actual contents of a document than the metawords associated with other types of tags, or the indexed words that are associated with the visible text portions of the document. In one embodiment, the indexing words that are associated with certain types of tags are treated as "bonusable". An indexing word that is treated as bonusable is given a greater weight than an indexing word that is not treated as bonusable in determining how the Web page is indexed. In an exemplary embodiment, the indexing words that are associated with the <title> tag, the <meta_keywords> tag and the <meta_description> tag are considered bonusable.

For example, in one embodiment, the words that are to be indexed for a particular Web page are normally given a weight of 1X. However, in certain embodiments, the indexing words that are associated with the <title> tag are bonused using a sliding weight of 12X to 18X, depending on what percentage of the title the indexing word makes-up. For example, if the title contains only two words, each indexing word is considered highly representative of the contents of the Web page and therefore generally bonused by 18X. However, if the title contains a total of twenty words, the indexing word are not considered as highly representative and therefore the indexing words are typically bonused by only 12X.

In a similar manner, in an exemplary embodiment, the indexing words associated with the <meta_keywords> tag and the <meta_description> tag are respectively given the sliding weight values of 3X–6X and 4X–7X depending on what percentage of the respective tags that each of the indexing words make-up.

INVISIBLE TEXT

One technique that is often used by Web marketers and site designers to create spoof documents is to add, to the otherwise visible text portion of their Web page, text that through various tricks, will be rendered virtually invisible. By stuffing a Web page with "invisible text" that includes popular search words, Web marketers may increase the number of hits on the Web page.

In certain Web pages, otherwise visible text is. rendered virtually "invisible" by using text having a font color that is the same, or nearly the same, as the background color of the Web page. In certain cases, a background image, such as a "GIF" file, may be included in a Web page. Because the color of the background image is not readily discernable from the source code of the Web page, it is impossible to programmatically determine whether the Web page contains text having the same font color as the background color of the page.

Another technique for generating invisible text in a Web page is to include text in the visible text portion of the Web page that is of a font size that is so small that it makes the text virtually invisible when the Web page is rendered.

In certain embodiments, the visible text portions of a Web page are scanned to determine whether it contains invisible text. In a preferred embodiment, if a Web page is identified as containing a word in invisible text that is repeated greater than a repeated invisible word threshold (e.g., three (3) or more times), the document is identified as a spoof document and indexing is therefore not performed on any words within the document. For example, if the word "Disney™" is contained three (3) times as invisible text within a document, the document is identified as a spoof document and thus no words within the document are indexed.

In one embodiment, if the background color or the presence of a background image cannot be determined for a Web page, then that text is assumed to be visible. In an exemplary embodiment, any text that is of a color that is significantly similar to the background color is identified as a possible spoof document. Thus, although the color of certain text may not match exactly with the background of the document, if the color of the text is within a color threshold limit of its background color, the text may be identified as invisible text. For example, if a document includes text that is of the color navy blue and the background color of the text is black, even though the colors are not an exact match, the text may still be identified as invisible text.

REPEATED KEYWORD TEST

One method of created a spoof document is by repeating a particular word many times within a document in order to increase its weighting factor. For example, by including the word "museum" fifty (50) times in a document, the word museum may be weighted to indicate that it significantly represents the content of the document. However, the document may instead be a pornographic Web site that is attempting to get hits from unknowing users that are searching for information about museums.

In one embodiment, if any word is included within a document more than a specified threshold amount, and that word represents more than a threshold percentage of the total words in the document, the document is identified as a spoof document and thus no words within the document are indexed. In an exemplary embodiment, if any word appears more than twenty-four (24) times in a document and represents more than eighteen percent (18%) of the total number of words in the document, the document is identified as a spoof document and thus no words within the document are indexed.

Additionally, a check may also be made to identify documents in which a particular word represents an extremely large percentage of the total words within the document. In an exemplary embodiment, if any word appears more than four (4) times in a document and represents more than sixty percent (60%) of the total number of words in the document, the document is identified as a spoof document and thus no words within the document are indexed.

TITLE LENGTH TEST

In analyzing electronic documents, it has been determined that documents having a title that include a substantially large number of words are generally found to be spoof documents. In one embodiment, any document that includes a title having greater than a title-word threshold number of words is identified as a spoof document and thus no words within the document are indexed. In an exemplary embodiment, any document that contains a title that includes more than fifty (50) words is identified as a spoof document and thus no words within the document are indexed.

INDEXING WEB PAGES

Figure 4:
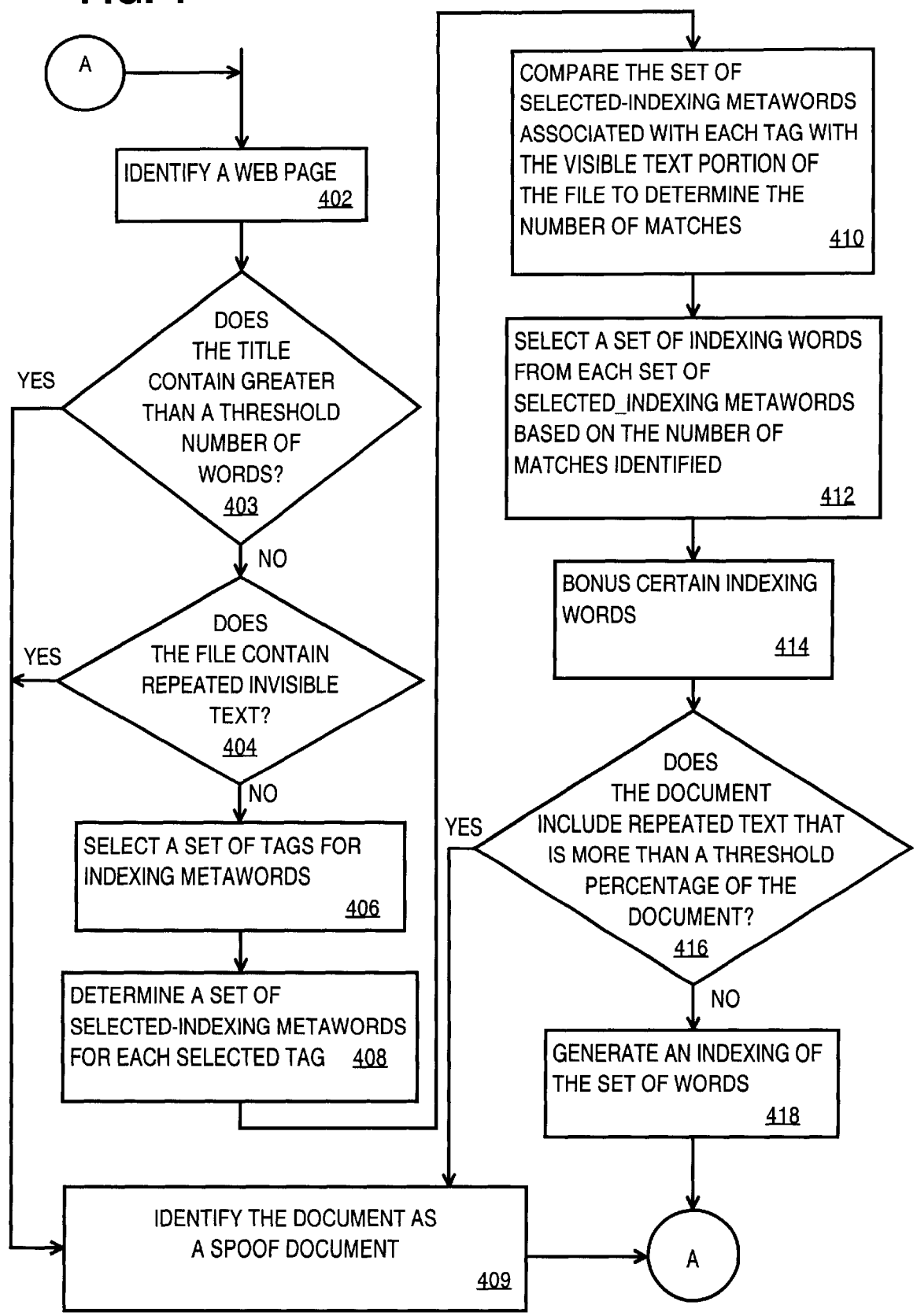
FIG. 4 is a flow diagram illustrating a sequence for indexing a Web document.

FIG. 4 is a flow diagram illustrating a sequence for indexing a Web page.

At step 402, a Web page is identified for indexing. For example, a spider follows a hyperlink associated with a current Web page to locate another page.

At step 403, the <title> tag is checked to determine whether it contains greater than a title-word threshold number of words. If it is determined that the title does not contain greater than a title-word threshold number of words, then control proceeds to step 404. Alternatively, if it is determined that the title does contain greater than a title-word threshold number of words, then the document is identified as a spoof document as depicted by step 409.

At step 404, the source code of the Web page is scanned to determine whether it contains invisible text and if so, whether the invisible text includes any words that are repeated greater than a repeated-invisible word threshold amount. If the Web page does contain invisible text and the invisible text includes a word that is repeated greater than the repeated-invisible word threshold amount, then the document is identified as a spoof document as depicted by step 409.

However, if it is determined that the Web page does not contain invisible text in which a word is repeated greater than the repeated-invisible word threshold amount, then at step 406, the tags whose associated metawords are to be used to index the Web page (the selected tags) are located within the Web page. For example, the <title> tag, the <meta_keywords> tag and the <meta_description> tag may be the selected tags. Under these conditions, step 406 would involve locating the <title>, <meta name="keywords" and <meta name="description" tags within the Web page. In certain embodiments, other tags, such as the <comment> tag, may be selected for indexing.

At step 408, a set of considered-for-indexing metawords is determined for each selected tag by selecting a particular set of metawords that are associated with each of selected tag. For example, the first fifteen non-stopword non-duplicate words that are associated with a <meta_keywords> tag or a <meta_description> tag may be chosen as considered-for-indexing metawords. Conversely, all of the non-stopword non-duplicate words that are associated with a <title> tag or possibly a <comment> tag may be chosen as considered-for-indexing metawords.

At step 410, the set of considered-for-indexing metawords associated with each selected tag is compared to the visible text portion of the Web page to identify matches.

At step 412, the selected-for-indexing metawords are determined based on the percentage of matches that are found for each set of considered-for-indexing metawords. For example, if only twenty-five percent (25%) of the considered-for-indexing metawords associated with the <title> tag are found to have matches within the visible text portion of the file, then only those words that have matches are included in the index word set (i.e. selected as indexing words). Conversely, if fifty-five percent (55%) of the considered-for-indexing metawords associated with the <title> tag are found to have matches within the visible text portion of the file, then all considered-for-indexing metawords that are associated with the <title> tag are included in the index word set (i.e. selected as indexing words).

At step 414, the bonusing of certain indexing words is performed. For example, the first five (5) indexing words that are associated with the <meta_keywords> tag may be bonused.

At step 416, the document is checked to determine whether it includes any words that are repeated more than a specified threshold amount, and whether such word represents more than a threshold percentage of the total words in the document. If it is determined that the document does include a word that is repeated more than a specified threshold amount, and the word represents more than a threshold percentage of the total words in the document, then the document is identified as a spoof document as depicted by step 409.

Alternatively, if the document does not include a word that is repeated more than a specified threshold amount, or the word does not represents more than a threshold percentage of the total words in the document, at step 418, index entries are generated for each indexing word. Control then proceeds to step 402 to identify another page for indexing.

ALTERNATIVES, EXTENSIONS

A mechanism for indexing Web pages is described herein. The mechanism allows for the detection of spoof Web pages. In one embodiment, when a spoof Web page is detected the Web page is not indexed. In describing certain embodiments of the invention, several drawing figures have been used for explanation purposes. However, the invention is not limited to any particular context as shown in drawing figures, and the spirit and scope of the invention include other contexts and applications in which the distributed authorization model described herein is available to other mechanisms, methods, programs, and processes. For example, the indexing of Web pages has been illustrated using only words in the English language. However, embodiments of the invention are not limited to any particular language or group of characters. For example, indexing may be performed on electronic Web pages that include words in German, French, Italian, Japanese, Chinese, Arabic, etc. In addition, indexing may be performed on electronic Web pages that include non-language words such as acronyms, pneumonic, or any other group of characters that may be a subject of interest.

In addition, in this disclosure, including in the claims, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

APPENDIX

LIST OF STOP-WORDS

"of", "to", "the", "a", "and", "i", "for", "s", "on", "by", "is", "this", "with", "at", "from", "all", "are", "or", "be", "that", "it", "as", "an", "you", "have", "page", "not", "home", "if", "can", "will", "new", "information", "one", "your", "more", "other", "about", "no", "has", "but", "was", "last", "copyright", "which", "may", "time", "any", "mail", "also", "we", "up", "com", "out", "do", "what", "name", "only", "next", "there", "use", "date", "so", "when", "back", "they", "some", "first", "their", "subject", "been", "these", "here", "who", "index", "our", "us", "two", "see", "how", "like", "than", "its", "please", "into", "would", "help", "over", "list", "most", "get", "site", "just", "comments", "rights", "web", "my", "now", "number"

What is claimed is:

1. A method for indexing electronic documents, wherein the electronic documents include one or more visible text portions and one or more non-visible text portions, the method comprising the computer-implemented steps of:

identifying an electronic document;

selecting from the electronic document a set of words that are associated with a particular tag type, wherein the set of words is selected from words within the one or more non-visible text portions of the electronic document;

comparing each word in said selected set of words with words in said one or more visible text portions of said electronic document; and determining an index word set for said electronic document based on matches between words in said selected set of words and words in said one or more visible text portions of said electronic document.

2. The method of claim 1, wherein the step of identifying an electronic document includes the step of identifying a Web page.

3. The method of claim 1, further comprising the steps of:

determining a plurality of selected tag types, said plurality of selected tag types including said particular tag type; and selecting from said electronic document multiple sets of words, wherein each set of the multiple sets of words is associated with one of the selected tag types.

4. The method of claim 3, wherein the step of determining a plurality of selected tag types includes the step of selecting one or more tags from a set of tag, type s consisting of:

HTML <title> tags;
HTML <comment> tags;
HTML <meta-description> tags; and
HTML <meta-keyword> tags.

5. The method of claim 1, wherein the step of comparing each word in said selected set of words with words in said one or more visible text portions of said electronic document further includes the step of comparing a subset of the selected set of words with words in said one or more visible text portions of said electronic document, wherein the subset does not include any duplicate words.

6. The method of claim 1, wherein the step of comparing each word in said selected set of words with words in said one or more visible text portions of said electronic document further includes the step of comparing a subset of the selected set of words with words in said one or more visible text portions of said electronic document, wherein the subset does not include any stop-words.

7. The method of claim 1, wherein the step of determining an index word set for said electronic document based on matches includes the step of:
  determining a percentage of matches based a particular number of matches that are found between words in said selected set of words and words in said one or more visible text portions of said electronic document;
  determining a minimum match percentage for the set of words; and
  if said percentage of matches is below said minimum match percentage, then generating the index word set based only on those words in said selected set of words for which there is a corresponding match in said one or more visible text portions of said electronic document.

8. The method of claim 7, further comprising the steps of:
  if said percentage of matches is not below said minimum match percentage, then generating the index word set based on all words within the selected set of words.

9. The method of claim 1, further comprising the steps of:
  determining whether the electronic document includes any invisible text; and
  if said electronic document includes invisible text, wherein the invisible text includes a word that is repeated greater than a repeated invisible word threshold, then not indexing any words contained in said electronic document.

10. The method of claim 1, wherein the step of determining an index word set for said electronic document includes the steps of:
  bonusing one or more words contained in said index word set;
  determining an indexing formula based on the bonusing of one or more words contained in said index word set; and
  generating indexes for indexing said electronic document based on the indexing formula.

11. The method of claim 1, wherein the step of selecting from the electronic document a set of words includes the step of selecting a predetermined first number of words that are associated with a HTML comment tag type.

12. The method of claim 1, wherein the step of selecting from the electronic document a set of words includes the step of selecting all words that are associated with a HTML title tag type.

13. The method of claim 1, wherein the step of selecting from the electronic document a set of words includes the step of not selecting any stop-words that are associated with the particular tag type.

14. The method of claim 1, wherein the step of selecting from the electronic document a set of words includes the step of not selecting any duplicate words that are associated with the particular tag type.

15. The method of claim 1, wherein the step of selecting from the electronic document a set of words includes the step of selecting a predetermined first number of words that are associated with a HTML tag that includes a keywords field.

16. The method of claim 1, wherein the step of selecting from the electronic document a set of words includes the step of selecting all words that are associated with an HTML description field.

17. The method of claim 1, further comprising the steps of:
  determining whether the electronic document includes a title that contains greater than a title-word threshold number of words; and
  if said electronic document includes a title that contains greater than a title-word threshold number of words, then not indexing any words contained in said electronic document.

18. The method of claim 1, further comprising the steps of:
  determining whether the electronic document includes any words which are repeated within the document more than a specified threshold amount of time and which represent more than a threshold percentage of words within the document; and
  if said electronic document includes any words which are repeated within the document more than the specified threshold amount of time and which represent more than the threshold percentage of words within the document, then not indexing any words contained in said electronic document.

19. A method for indexing an electronic document, the method comprising the computer-implemented steps of:
  identifying a first portion of the electronic document that is not displayed when the document is rendered;
  identifying a second portion of the electronic document that is displayed when the document is rendered;
  performing a comparison between words from the first portion and words from the second portion;
  determining a set of words from said first portion to use to index said electronic document based on said comparison; and
  indexing said electronic document based on said set of words.

20. A computer-readable medium carrying one or more sequences of instructions for indexing electronic documents that include one or more visible text portions and one or more non-visible text portions, wherein execution of the one or more sequences of instructions by one or more processors causes the one or more processors to perform the steps of:
  identifying an electronic document;
  selecting from the electronic document a set of words that are associated with a particular tag type, wherein the set of words is selected from words within the one or more non-visible text portions of the electronic document;
  comparing each word in said selected set of words with words in said one or more visible text portions of said electronic document; and
  determining an index word set for said electronic document based on matches between words in said selected set of words and words in said one or more visible text portions of said electronic document.

21. The computer-readable medium of claim 20, wherein the step of identifying an electronic document includes the step of identifying a Web page.

22. The computer-readable medium of claim 20, further comprising instructions for performing the steps of:
    determining a plurality of selected tag types, said plurality of selected tag types including said particular tag type; and
    selecting from said electronic document multiple sets of words, wherein each set of the multiple sets of words is associated with one of the selected tag types.

23. The computer-readable medium of claim 22, wherein the step of determining a plurality of selected tag types includes the step of selecting one or more tags from a set of tag types consisting of:
    HTML <title> tags;
    HTML <comment> tags;
    HTML <meta-description> tags; and
    HTML <meta-keyword> tags.

24. The computer-readable medium of claim 20, wherein the step of comparing each word in said selected set of words with words in said one or more visible text portions of said electronic document further includes instructions for performing the step of comparing a subset of the selected set of words with words in said one or more visible text portions of said electronic document, wherein the subset does not include any duplicate words.

25. The computer-readable medium of claim 20, wherein the step of comparing each word in said selected set of words with words in said one or more visible text portions of said electronic document further includes instructions for performing the step of comparing a subset of the selected set of words with words in said one or more visible text portions of said electronic document, wherein the subset does not include any stop-words.

26. The computer-readable medium of claim 20, where in the step of determining an index word set for said electronic document based on matches includes the step of:
    determining a percentage of matches based a particular number of matches that are found between words in said selected set of words and words in said one or more visible text portions of said electronic document;
    determining a minimum match percentage for the set of words; and
    if said percentage of matches is below said minimum match percentage, then generating the index word set based only on those words in said selected set of words for which there is a corresponding match in said one or more visible text portions of said electronic document.

27. The computer-readable medium of claim 26, further comprising instructions for performing the steps of:
    if said percentage of matches is not below said minimum match percentage, then generating the index word set based on all words within the selected set of words.

28. The computer-readable medium of claim 20, further comprising instructions for performing the steps of:
    determining whether the electronic document includes any invisible text; and
    if said electronic document includes invisible text, wherein the invisible text includes a word that is repeated greater than a repeated invisible word threshold, then not indexing any words contained in said electronic document.

29. The computer-readable medium of claim 20, wherein the step of determining an index word set for said electronic document includes the steps of:
    bonusing one or more words contained in said index word set;
    determining an indexing formula based on the bonusing of one or more words contained in said index word set; and
    generating indexes for indexing said electronic document based on the indexing formula.

30. The computer-readable medium of claim 20, wherein the step of selecting from the electronic document a set of words includes the step of selecting a predetermined first number of words that are associated with a HTML comment tag type.

31. The computer-readable medium of claim 20, wherein the step of selecting from the electronic document a set of words includes the step of selecting all words that are associated with a HTML title tag type.

32. The computer-readable medium of claim 20, wherein the step of selecting from the electronic document a set of words includes the step of not selecting any stop-words that are associated with the particular tag type.

33. The computer-readable medium of claim 20, wherein the step of selecting from the electronic document a set of words includes the step of not selecting any duplicate words that are associated with the particular tag type.

34. The computer-readable medium of claim 20, wherein the step of selecting from the electronic document a set of words includes the step of selecting a predetermined first number of words that are associated with a HITML tag that includes a keywords field.

35. The computer-readable medium of claim 20, wherein the step of selecting from the electronic document a set of words includes the step of selecting all words that are associated with an HTML description field.

36. The computer-readable medium of claim 20, further comprising instructions for performing the steps of:
    determining whether the electronic document includes a title that contains greater than a title-word threshold number of words; and
    if said electronic document includes a title that contains greater than a title-word threshold number of words, then not indexing any words contained in said electronic document.

37. The computer-readable medium of claim 20, further comprising instructions for performing the steps of:
    determining whether the electronic document includes any words which are repeated within the document more than a specified threshold amount of time and which represent more than a threshold percentage of words within the document; and
    if said electronic document includes any words which are repeated within the document more than the specified threshold amount of time and which represent more than the threshold percentage of words within the document, then not indexing any words contained in said electronic document.

38. A computer-readable medium carrying one or more sequences of instructions for indexing an electronic document, wherein execution of the one or more sequences of instructions by one or more processors causes the one or more processors to perform the steps of:
    identifying a first portion of the electronic document that is not displayed when the document is rendered;
    identifying a second portion of the electronic document that is displayed when the document is rendered;
    performing a comparison between words from the first portion and words from the second portion;

determining a set of words from said first portion to use to index said electronic document based on said comparison; and indexing said electronic document bas ed on said set of words.

39. A computer system for indexing electronic documents, wherein the electronic documents include one or more visible text portions and one or more non-visible text portions, the computer system comprising:

a memory;

one or more processors coupled to the memory; and a set of computer instructions contained in the memory, the set of computer instruction s including computer instructions which when executed by the one or more processors, cause the one or more processors to perform the steps of:

identifying an electronic document;

selecting from the electronic document a set of words that are associated with a particular tag type, wherein the set of words is selected from words within the one or more non-visible text portions of the electronic document;

comparing each word in said selected set of words with words in said one or more visible text portions of said electronic document; and determining an index word set for said electronic document based on matches between words in said selected set of words and words in said one or more visible text portions of said electronic document.

* * * * *

UNITED STATES PATENT AND TRADEMARK OFFICE
CERTIFICATE OF CORRECTION

PATENT NO.    : 6,442,606 B1                                            Page 1 of 1
DATED         : August 27, 2002
INVENTOR(S)   : Subbaroyan et al.

It is certified that error appears in the above-identified patent and that said Letters Patent is hereby corrected as shown below:

Column 19,
Line 4, replace "base d" with -- based --.
Line 14, replace "instruction s" with -- instructions --.

Signed and Sealed this

Twenty-fifth Day of February, 2003

JAMES E. ROGAN
*Director of the United States Patent and Trademark Office*